United States Patent Office

2,921,093
Patented Jan. 12, 1960

2,921,093

ALKYLENE-BIS-(N-METHYL-2,6-DIALKYL-ANILINES)

Seymour L. Shapiro, Hastings on Hudson, and Louis Freedman, Bronxville, N.Y., assignors to U.S. Vitamin & Pharmaceutical Corporation, a corporation of Delaware No Drawing. Application January 17, 1958
Serial No. 709,475

5 Claims. (Cl. 260—570.5)

This invention relates to alkylene-bis-(N-methyl-2,6-dialkylanilines) having the following formula:

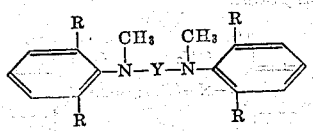

wherein R is methyl and straight chain lower alkyl, and Y is a bivalent straight chain hydrocarbon linking element which may be saturated or unsaturated, and which contains at least two, and not more than twelve carbon atoms and preferably two to six carbon atoms.

The compounds of this invention thus belong to the class of bisanilines wherein each anilino nitrogen bears one methyl group, and the two anilino nitrogens are joined by the hydrocarbon linking element Y. In turn, each of the two phenyl groups in the formula has an alkyl group in both the 2 and 6 positions, the position bearing the nitrogen being designated as the 1 position. A consequence of this disposition of the groups is that due to steric hindrance there is inhibition of typical aniline resonance, as well as steric inhibition of solvation of the structures concerned. The compounds of this invention are accordingly distinct from such substances wherein the anilino nitrogens do not bear methyl groups, and wherein the phenyl rings do not have substituents in the 2,6 positions. The compounds of this invention can be neutralized by hydrochloric acid, hydrobromic acid and the like, and in this form show desirable pharmacological properties, particularly as central nervous system depressants.

The compounds of this invention are prepared by a variety of procedures which are described below as methods A and B.

Method A.—The 2,6-dialkylaniline is first converted to the N-methyl-2,6-dialkylaniline by treatment with methyl iodide. An excess of the N-methyl-2,6-dialkylaniline is reacted with X—Y—X, this generic formula being a compound of the type wherein Y has the same significance as described above, and X is selected from the groups consisting of halogen, and p-toluene sulfate, and the desired alkylene-bis-(N-methyl-2,6-dialkylaniline) isolated.

Method B.—An excess of 2,6-dialkylaniline is reacted with X—Y—X and the formed alkylene-bis-(2,6-dialkylaniline) is isolated and converted by treatment with formaldehyde-formic acid to the desired alkylene-bis-(N-methyl-2,6-dialkylaniline).

As more specifically illustrative of the preparation of the compounds contemplated by this invention, the following specific examples of the preparation of specific compounds contemplated by this invention will serve to exemplify the preparation by the various methods used.

EXAMPLE I

*N-methyl-2,6-dimethylaniline*

A mixture of 140 g. (1.14 moles) of 2,6-dimethylaniline and 140 g. (0.98 mole) of methyl iodide was heated on the steam bath for 0.25 hour. The crystalline mass which formed, 217 g., was separated and rinsed with ether, dried and treated with 300 ml. of water. After addition of excess 6 N sodium hydroxide, the product was extracted with three 200 ml. portions of ether. The combined ether extracts were dried (magnesium sulfate), filtered, the ether removed, and the residue distilled. The product, 96.7 g. (69%), was collected, boiling at 206° C.

EXAMPLE II

*N-methyl-2,6-diethylaniline*

In a manner similar to that described above using 2,6-diethylaniline, the product was obtained in 81% yield boiling at 229–231° C.

*Analysis.*—Calcd. for $C_{11}H_{17}N$: C, 80.9; H, 10.5; N, 8.6. Found: C, 80.8; H, 10.7; N, 8.6.

EXAMPLE III

Method A.—*Ethylene-bis-(N-methyl-2,6-dimethylaniline)*

A mixture of 27 g. (0.2 mole) of N-methyl-2,6-dimethylaniline, 9.4 g. (0.05 mole) of ethylene dibromide and 50 mg. of potassium iodide was heated in an oil bath at 140° C. for 1 hour. After addition of 100 ml. of water and 100 ml. of 6 N sodium hydroxide, the product was extracted with three 100 ml. portions of ether. The combined ether extract was dried (magnesium sulfate), filtered, the ether removed and the residue distilled. The product, 2.25 g. (15%) boiled at 148–152° C./0.2 mm.

*Analysis.*—Calcd for $C_{20}H_{28}N_2$: C, 81.0; H, 9.5; N, 9.4. Found: C, 81.1; H, 9.5; N, 9.2.

EXAMPLE IV

Method B. — *Trimethylene-bis-(N-methyl-2,6-dimethylaniline)*

To a solution of 12.4 g. (0.044 mole) of trimethylene-bis-(2,6-dimethylaniline) in 25 ml. (0.56 mole) of 87% formic acid, there was added 14 ml. (0.17 mole) of 37% aqueous formaldehyde and the mixture heated on a steam bath for ten hours. After addition of 60 ml. of N hydrochloric acid, the reaction mixture was concentrated in vacuo, the residue dissolved in 100 ml. of water and treated with 40 ml. of 6 N sodium hydroxide. The product was extracted with three 100 ml. portions of ether, the combined ether extracts dried (magnesium sulfate), filtered, the ether removed and the residue distilled. The product obtained, 5.9 g. (43%), boiled at 158–163° C./0.05 mm.

Typifying, but not limiting the products herein, there is reported in Table I, a series of compounds with their physical properties and the method used for their preparation.

TABLE I

ALKYLENE-BIS-(N-METHYL-2,6-DIALKYLANILINES)

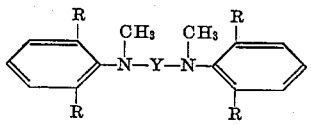

| R | Y | B.P., °C. | mm. Press. | Formula | Method |
|---|---|---|---|---|---|
| $CH_3-$ | $-(CH_2)_2-$ | 148-152 | 0.2 | $C_{20}H_{28}N_2$ | A |
| $CH_3-$ | $-(CH_2)_3-$ | 158-163 | 0.05 | $C_{21}H_{30}N_2$ | B |
| $CH_3-$ | $-(CH_2)_4-$ | 150-154 | 0.06 | $C_{22}H_{32}N_2$ | A |
| $CH_3-$ | $-(CH_2)_5-$ | 156-164 | 0.03 | $C_{23}H_{34}N_2$ | B |
| $CH_3-$ | $-(CH_2)_6-$ | 184 | 0.04 | $C_{24}H_{36}N_2$ | B |
| $CH_3-$ | $-CH_2-C{\equiv}C-CH_2-$ | 158-162 | 0.08 | $C_{22}H_{28}N_2$ | A |
| $C_2H_5-$ | $-(CH_2)_2-$ | 168-173 | 0.12 | $C_{24}H_{36}N_2$ | B |
| $C_2H_5-$ | $-(CH_2)_3-$ | 166-176 | 0.18 | $C_{25}H_{38}N_2$ | B |
| $C_2H_5-$ | $-(CH_2)_5-$ | 174-184 | 0.15 | $C_{27}H_{22}N_2$ | B |

Various modifications may be made in the method and compounds of the present invention without departing from the spirit or scope thereof, and it is to be understood that we limit ourselves only as defined in the appended claims.

Having described our invention, what we claim as new and desire to secure by Letters Patent is:

1. A compound having the formula

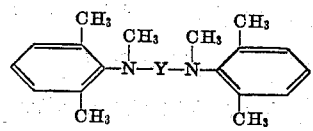

wherein Y is a straight chain polymethylene group containing from 2 to 6 carbon atoms.

2. The compound

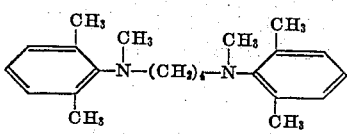

3. The compound

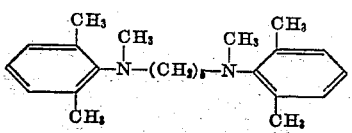

4. The compound

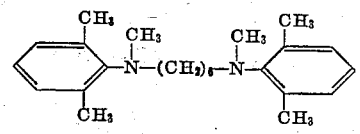

5. The compound

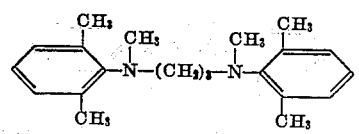

References Cited in the file of this patent

UNITED STATES PATENTS 1,965,463    Jones    July 3, 1934
2,830,048    Biel    Apr. 8, 1958

OTHER REFERENCES

Braun et al.: Ber. der Deut. Chem. Gesell., vol 51 (1918), page 279.

Beilstein: Handbuch der Org. Chem., vol. 12 (1929), pp. 825–828, System No. 1679.

Dodds: Proceedings Royal Soc. (London) (1945), Series B, vol. 132, pp. 119–32 (pp. 119-23 relied on).

Boon: J. Chem. Soc. (1947), pp. 309, 310.